(12) United States Patent
Baker et al.

(10) Patent No.: US 7,024,067 B2
(45) Date of Patent: Apr. 4, 2006

(54) COMMUNICATION SYSTEM WITH A SIGNAL CONDUCTION MATRIX AND SURFACE SIGNAL ROUTER

(75) Inventors: Jay D. Baker, Dearborn, MI (US); Zhong-You Shi, Ann Arbor, MI (US); Lawrence L. Kneisel, Novi, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 121 days.

(21) Appl. No.: 10/268,407

(22) Filed: Oct. 10, 2002

(65) Prior Publication Data

US 2003/0099426 A1 May 29, 2003

Related U.S. Application Data

(60) Provisional application No. 60/330,306, filed on Oct. 19, 2001.

(51) Int. Cl.
*G02B 6/26* (2006.01)
(52) U.S. Cl. .............................. 385/15; 385/14; 385/18
(58) Field of Classification Search ................. 385/15, 385/14, 42, 16, 18, 31, 39
See application file for complete search history.

(56) References Cited

U.S. PATENT DOCUMENTS

| | | |
|---|---|---|
| 3,448,616 A | 6/1969 | Wostl et al. |
| 3,463,134 A | 8/1969 | Zechnall et al. |
| 3,895,612 A | 7/1975 | Keely et al. |
| 4,134,639 A | 1/1979 | DiVita |
| 4,269,152 A | 5/1981 | Van Siclen, Jr. |
| 4,280,751 A | 7/1981 | SiVita |
| 4,311,048 A | 1/1982 | Merz |
| 4,447,118 A | 5/1984 | Mulkey |
| 4,674,828 A | 6/1987 | Takahashi et al. |
| 4,711,997 A | 12/1987 | Miller |
| 4,745,293 A | 5/1988 | Christensen |
| 4,757,212 A | 7/1988 | Saito |
| 4,789,214 A | 12/1988 | Vilhelmsson et al. |

(Continued)

FOREIGN PATENT DOCUMENTS

DE 28 39 127 A1 3/1980

(Continued)

OTHER PUBLICATIONS

Brian, M., "How Car Engines Work", http://www.howstuffworks.com/engine1.htm, pp. 1-4, 2002.

(Continued)

*Primary Examiner*—Kaveh Kianni
(74) *Attorney, Agent, or Firm*—Brinks Hofer Gilson & Lione

(57) ABSTRACT

A signal transmission system comprising a signal conduction matrix formed into a shape that allows transmission of a signal through the matrix using at least one surface signal router, at least one signal source operatively connected to a surface of the matrix and that generates a signal that propagates through matrix, and at least one signal receiver operatively connected to a surface of the matrix and that receives the signal from the signal source. The signal may be coded, modulated, frequency-converted, or amplified. The surface signal router can be a reflective coating, an indentation, a pressure fit structure, or at least one inclined cut on the surface of the matrix. A frequency-selective filter can be used to allow selective detection by a target signal receiver. The invention is also directed to various method of transmitting a signal using a signal conduction matrix.

17 Claims, 12 Drawing Sheets

U.S. PATENT DOCUMENTS

| | | | |
|---|---|---|---|
| 4,817,466 A | 4/1989 | Kawamura et al. | |
| 4,851,969 A | 7/1989 | Davenport et al. | |
| 4,912,522 A | 3/1990 | Oates et al. | |
| 4,928,319 A | 5/1990 | Pitt et al. | |
| 4,963,729 A | 10/1990 | Spillman et al. | |
| 5,001,642 A | 3/1991 | Botzenhardt et al. | |
| 5,077,482 A | 12/1991 | Vali et al. | |
| 5,089,696 A | 2/1992 | Turpin | |
| 5,214,707 A | 5/1993 | Fujimoto et al. | |
| 5,226,090 A | 7/1993 | Kimura | |
| 5,247,580 A | 9/1993 | Kimura et al. | |
| 5,291,032 A | 3/1994 | Vali et al. | |
| 5,323,477 A * | 6/1994 | Lebby et al. | 385/129 |
| 5,328,665 A | 7/1994 | Geiger | |
| 5,380,014 A | 1/1995 | Schäperkötter | |
| 5,384,467 A | 1/1995 | Plimon et al. | |
| 5,521,992 A | 5/1996 | Chun et al. | |
| 5,539,200 A | 7/1996 | Lebby et al. | |
| 5,659,132 A | 8/1997 | Novak et al. | |
| 5,693,936 A | 12/1997 | Komachiya et al. | |
| 5,745,611 A | 4/1998 | Komachiya et al. | |
| 5,822,099 A | 10/1998 | Takamatsu | |
| 5,831,263 A | 11/1998 | Komachiya et al. | |
| 5,872,609 A | 2/1999 | Hiji et al. | |
| 5,936,235 A | 8/1999 | Minamitani et al. | |
| 6,036,329 A | 3/2000 | Iimura | |
| 6,150,734 A | 11/2000 | Neibecker et al. | |
| 6,173,609 B1 | 1/2001 | Modlin et al. | |
| 6,186,106 B1 | 2/2001 | Glovatsky et al. | |
| 6,230,138 B1 | 5/2001 | Everhart | |
| 6,240,347 B1 | 5/2001 | Everhart et al. | |
| 6,243,416 B1 * | 6/2001 | Matsushiro et al. | 375/240 |
| 6,301,030 B1 | 10/2001 | Robinson | |
| 6,301,957 B1 | 10/2001 | Sakaguchi et al. | |
| 6,320,184 B1 | 11/2001 | Winklhofer et al. | |
| 6,330,377 B1 * | 12/2001 | Kosemura | 385/14 |
| 6,357,426 B1 | 3/2002 | Schleupen | |
| 6,567,590 B1 * | 5/2003 | Okada et al. | 385/49 |
| 6,650,822 B1 * | 11/2003 | Zhou | 385/147 |
| 2001/0019568 A1 | 9/2001 | Sakata | |
| 2002/0028045 A1 * | 3/2002 | Yoshimura et al. | 385/50 |

FOREIGN PATENT DOCUMENTS

| | | |
|---|---|---|
| EP | 0 266 934 A1 | 5/1988 |
| EP | 0 454 165 A2 | 10/1991 |
| EP | 0 487 918 A2 | 6/1992 |
| GB | 2 164 516 A | 3/1986 |
| GB | 2 177 869 A | 1/1987 |
| JP | 58 225 746 A | 6/1982 |
| JP | 360183630 A | 9/1985 |
| JP | 61-106930 | 5/1986 |
| JP | 2-207204 | 8/1990 |
| WO | WO 85/03179 | 7/1985 |
| WO | WO8503179 * | 7/1985 |
| WO | WO 89/09324 | 10/1998 |

OTHER PUBLICATIONS

Nice, K., "How Automobile Ignition Systems Work", httyp://www.howstuffworks.com/ignition-system.htm/printable, pp. 1-9, 2002.

Ofria, C., "A Short Course on Automobile Engines", http://www.familycar.com/engine.htm.

Copy of Search Report dated May 28, 2003 in connection with Application No. GB 0224391.3.

Copy of a Search Report dated May 22, 2003 in connection with Application No. GB 0224032.3.

* cited by examiner

Light signals travel in the optical fibers that are molded inside the substrate

Light signals travel in the molded wave guide

Light signals travel in the molded wave guide

COMMUNICATION SYSTEM WITH A SIGNAL CONDUCTION MATRIX AND SURFACE SIGNAL ROUTER

This application claims the benefit of a U.S. Provisional Application No. 60/330,306 filed on Oct. 19, 2001, the entirety of which is incorporated herein.

FIELD OF THE INVENTION

The invention generally relates to a communication system and method of signal transmission. In particular, the invention relates to a signal communication system comprising a signal conduction matrix that has a light-transmissive material that allows the transmission of a signal through the use of surface signal routers.

BACKGROUND OF THE INVENTION

Electronic components are commonly mounted on the surface of conventional molded 3-dimensional substrates. Presently, communications between the components on such a substrate occur mainly through the use of hole drillings, electrical wirings, and other conventional connectors. However, reliance on conventional connection techniques creates various disadvantages such as added complexity in component assembly, inconsistent connector reliability due to the large number of required wirings, signal interference and cross-talking between adjacent wires, increase in the weight of the substrate, lower data transfer rate, and high production cost.

BRIEF SUMMARY OF THE INVENTION

The present invention is directed to a molded signal conduction matrix for use as a signal conductor to permit communications between various electrical, optical, optoelectronic, and other types of components. This can be achieved by using techniques such as converting a signal into a light or RF signal and then allowing the signal to propagate through a signal conduction matrix.

In one aspect of the invention, a signal transmission system is provided that comprises a signal conduction matrix formed into a shape that allows transmission of a signal through the matrix through the use of at least one surface signal router. The matrix may be partially or substantially composed of a light-transmissive material. At least one signal source is operatively connected to a surface of the matrix and generates a signal that propagates through the matrix. The signal, which may undergo multiple internal reflections within the matrix, is received by the at least one signal receiver operatively connected to a surface of the matrix.

In another aspect, a signal transmission system is provided that has a signal conduction matrix formed into a shape that allows transmission of a signal through the matrix through the use of at least one surface signal router. The matrix may be partially or entirely composed of a light-transmissive material. At least one signal source is operatively connected to a surface of the matrix and generates a signal that propagates through the light-transmissive material. In this aspect, the signal is coded to allow its selective detection by a target signal receiver. At least one signal receiver is operatively connected to a surface of the matrix and receives the signal from the signal source, In still another aspect of the invention, a signal transmission system is provided that comprises a signal conduction matrix formed into a shape that allows wireless transmission of a signal through the matrix using a surface signal router. The matrix may be partially or entirely composed of a light-transmissive material. At least one signal source is operatively connected to a surface of the matrix and generates the signal that propagates through the matrix. In this aspect of the invention, the signal may be coded, modulated, frequency-converted, or amplified. At least one signal receiver is operatively connected to a surface of the matrix and receives a signal from the signal source.

In another aspect, a signal transmission system is provided that comprises a signal conduction matrix that is formed into a shape that allows transmission of a signal through the matrix through the use of a reflective coating and at least one surface signal router selected from an indentation, pressure fit structure, or an inclined cut on the surface of the matrix. The matrix may be partially or entirely composed of a light-transmissive material. At least one signal source is operatively connected to a surface of the matrix and generates a signal that propagates through the matrix. At least one signal receiver is operatively connected to a surface of the matrix and receives a signal from the signal source. In this aspect, a frequency-selective filter is used to permit the signal to be selectively detected by a signal receiver.

The present invention is also directed to various methods of transmitting a signal using the signal conduction matrix of the invention. In one aspect of the invention, a method of transmitting a signal is provided that comprises generating a signal using at least one signal source that is operatively connected to a surface of a signal conduction matrix. The matrix may be partially or entirely composed of a light-transmissive material. The direction of propagation of the signal is controlled using at least one surface signal router, wherein the signal propagates through the matrix. The matrix is formed into a shape that allows or maximizes the transmission of a signal through the matrix using at least one surface signal router. A subsequent step of the method involves receiving the signal using at least one signal receiver that is operatively connected to a surface of the matrix.

In another aspect of the invention, a method of transmitting a signal is provided that comprises generating a signal using at least one signal source that is operatively connected to a surface of a signal conduction matrix. The matrix may be partially or entirely composed of a light-transmissive material. The signal is coded to allow its selective detection by a signal receiver. In this method, the direction of propagation of the signal is controlled using at least one surface signal router, wherein the signal propagates through the matrix. The matrix is formed into a shape that allows the direction of propagation of a signal to be controlled using at least one surface signal router. In a subsequent step, the signal is received using the signal receiver that is operatively connected to a surface of the matrix.

In still another aspect of the invention, a method of transmitting a signal is provided that comprises generating a signal using at least one signal source that is operatively connected to a surface of a signal conduction matrix. The matrix may be partially or entirely composed of a light-transmissive material. The matrix is formed into a shape that allows transmission of a signal through the matrix using at least one surface signal router. The signal is received by at least one signal receiver that is operatively connected to a surface of the matrix, and a frequency-selective filter is used to allow selective detection by the at least one signal receiver.

DETAILED DESCRIPTION OF THE INVENTION

Figure 1:
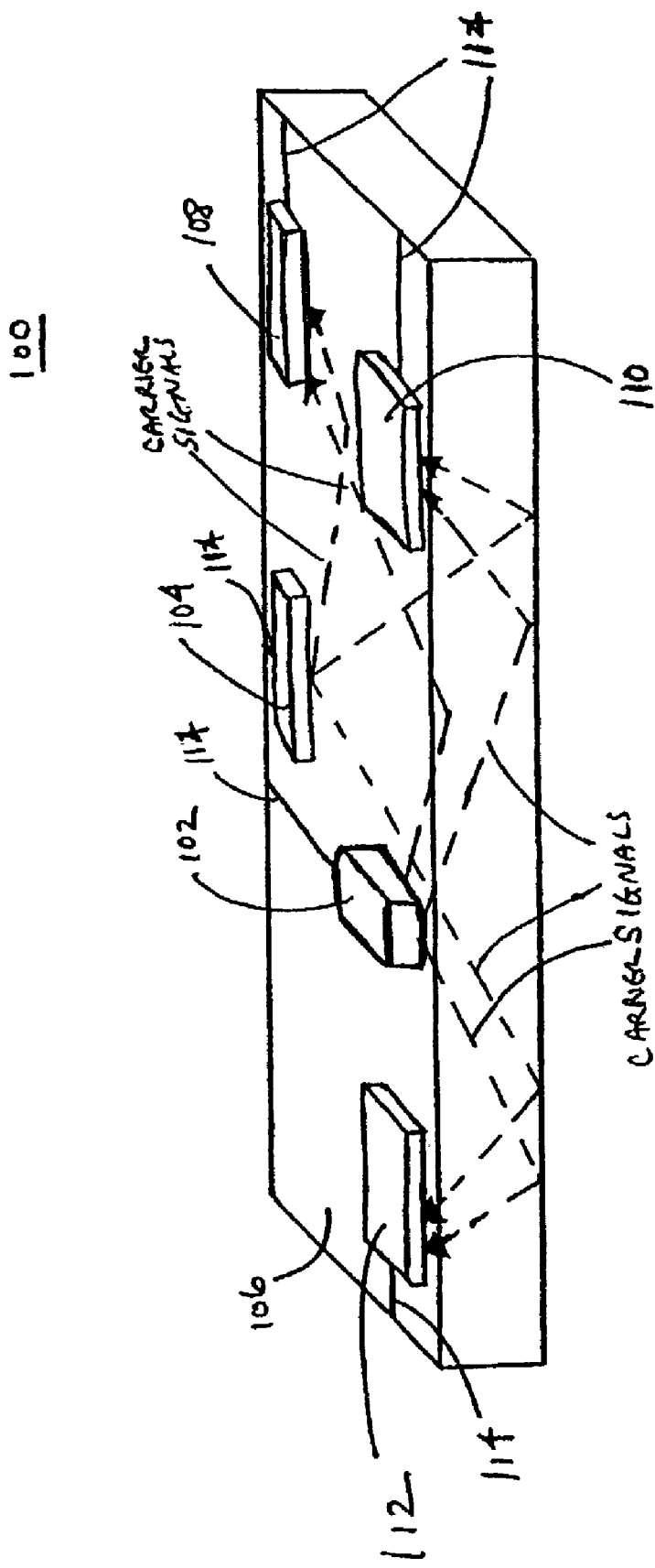
FIG. 1 is a perspective view of a signal conduction matrix shown with several components according to one embodiment.

The signal conduction matrix is a structure that is partially or substantially made of at least one type of light-transmissive material formed into a shape that would allow the transmission of a signal within the signal conduction matrix using at least one surface signal router. The signal conduction matrix is described in more detail below, but one of its characteristics is that it can be used as a substrate, such as an optical substrate, that can be formed into various shapes such as a rectangular slab or the shape of a part or the entirety of, for example, a main frame of an instrument panel display. The signal conduction matrix can also be integrated as a substrate or part of the substrate of, for example, a printed circuit board. As such, it can be used as a primary or secondary transmission means for a signal, such as an optical signal propagating from at least one signal source to at least one signal receiver.

The signal conduction matrix and signal transmission method of the invention provides several advantages. It eliminates or minimizes the need for wiring and connectors on the substrate and eliminates the need for shielding which is normally necessary to block electromagnetic interferences involving light signals. The present invention is also highly reliable, easier to assemble, and has a higher efficiency of coupling between transmitter/receiver and the signal conduction matrix. Another advantage of the present invention is that optical signals can be transferred within the matrix multi-directionally, i.e., a single master transmitter can talk to multiple slave receivers simultaneously and a single receiver can listen to multiple transmitters. In addition, the signal conduction matrix of the invention can be integrated as a substrate or part of the substrate of, for example, a printed circuit board, or as part of a molded three-dimensional structure. Further, because the present invention eliminates cross-talking and interference between adjacent signal conductors, noise and signal distortion are excluded or reduced.

In one aspect of the invention, electronic, optical, or optoelectronic components are placed on the surface of the signal conduction matrix. In another aspect, the signal conduction matrix encompasses one or more electronic, optical, or optoelectronic components to allow a signal such as an optical signal to be directed to the various components within the substrate. Thus, one or more components may be embedded within the signal conduction matrix while other components are positioned on the surface of the signal conduction matrix. Signal transmission can therefore be accomplished without having to resort to the use of conventional connectors, wirings, or signal focusing means such as a beam splitter or focusing lens. The signal conduction matrix may also assume other shapes such as a ring, strand, sheet, or ribbon.

Structures that comprise a matrix include a matrix in the form of strands or other structural shapes. Structures that comprise a matrix also include a matrix connected or fabricated with one or more components or systems such as a detector, light source, or an electronic system.

A surface signal router directs a signal from the signal source to one or more target signal recipients, such as a photodetector or an IR analyzer, that are positioned at various points on the surface of the signal conduction matrix. A surface signal router can be a reflective coating on the surface of the signal conduction matrix. When reflective coatings are used as surface signal routers, they are preferably strategically distributed throughout the various areas or sections of the surface of the signal conduction matrix depending on factors such as the number and type of components that form part of a signal conduction network.

A surface signal router can also assume the form of an indentation or a pressure fit structure. It can also assume the form of inclined, oblique, or wedge-shaped cuts on the surface of the 3-D signal conduction matrix. As used herein, an "inclined" cut includes cuts having an angular shape relative to a surface of the matrix; this includes oblique and wedge-shaped cuts. Routers in the form of surface cuts with other shapes such as zig-zag, wavy, or combinations of various shapes may also be used. Preferably, these surface cuts are coated with at least one reflective material such as a metal or metal alloy. In one aspect, a combination of reflective coatings and surface cuts with reflective coatings is used to enable a signal to propagate through the signal conduction matrix via, for example, multiple internal reflections.

Figure 2:
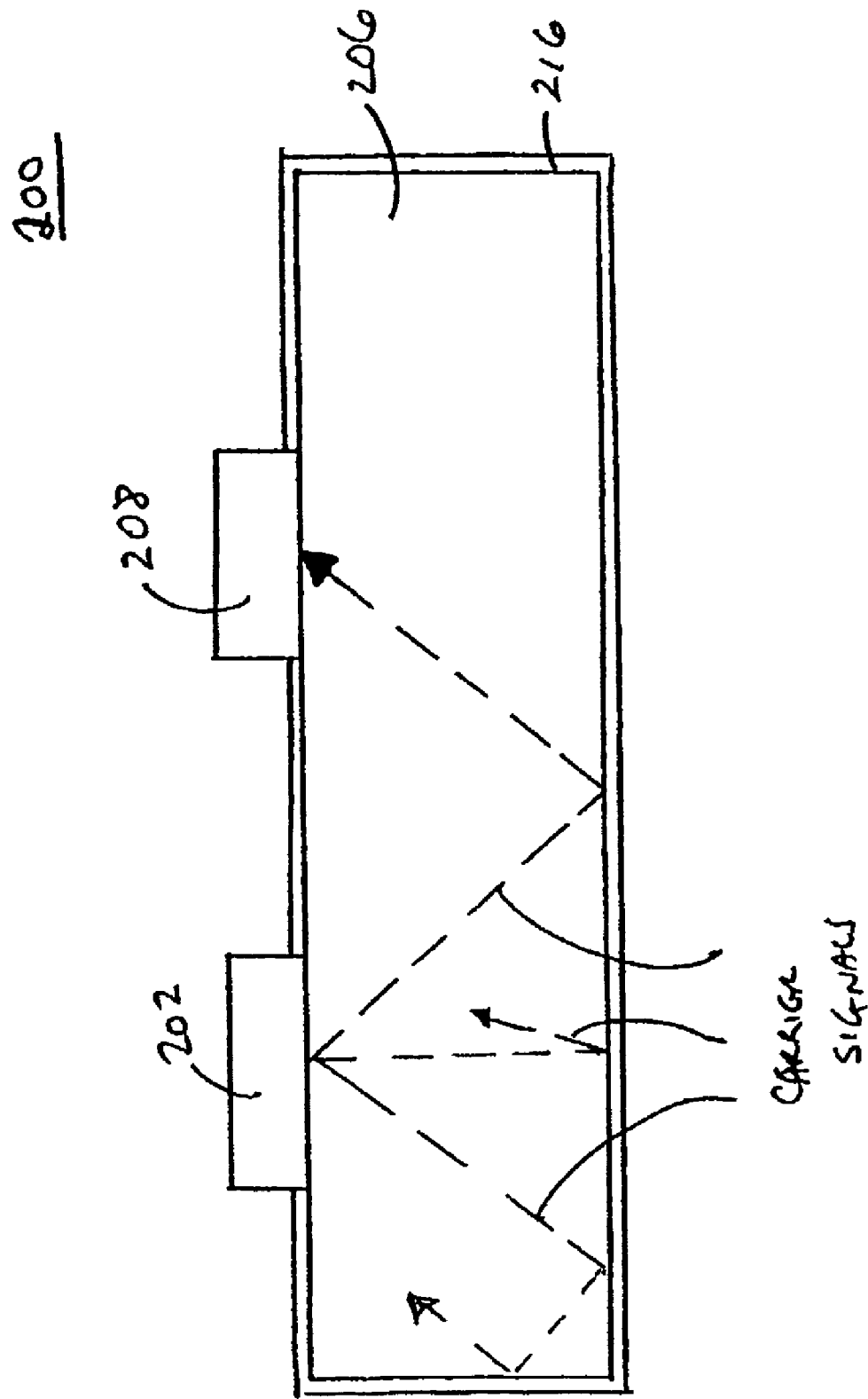
FIG. 2 is a side view of a signal conduction matrix that includes a signal source and a signal receiver.
Figure 3:
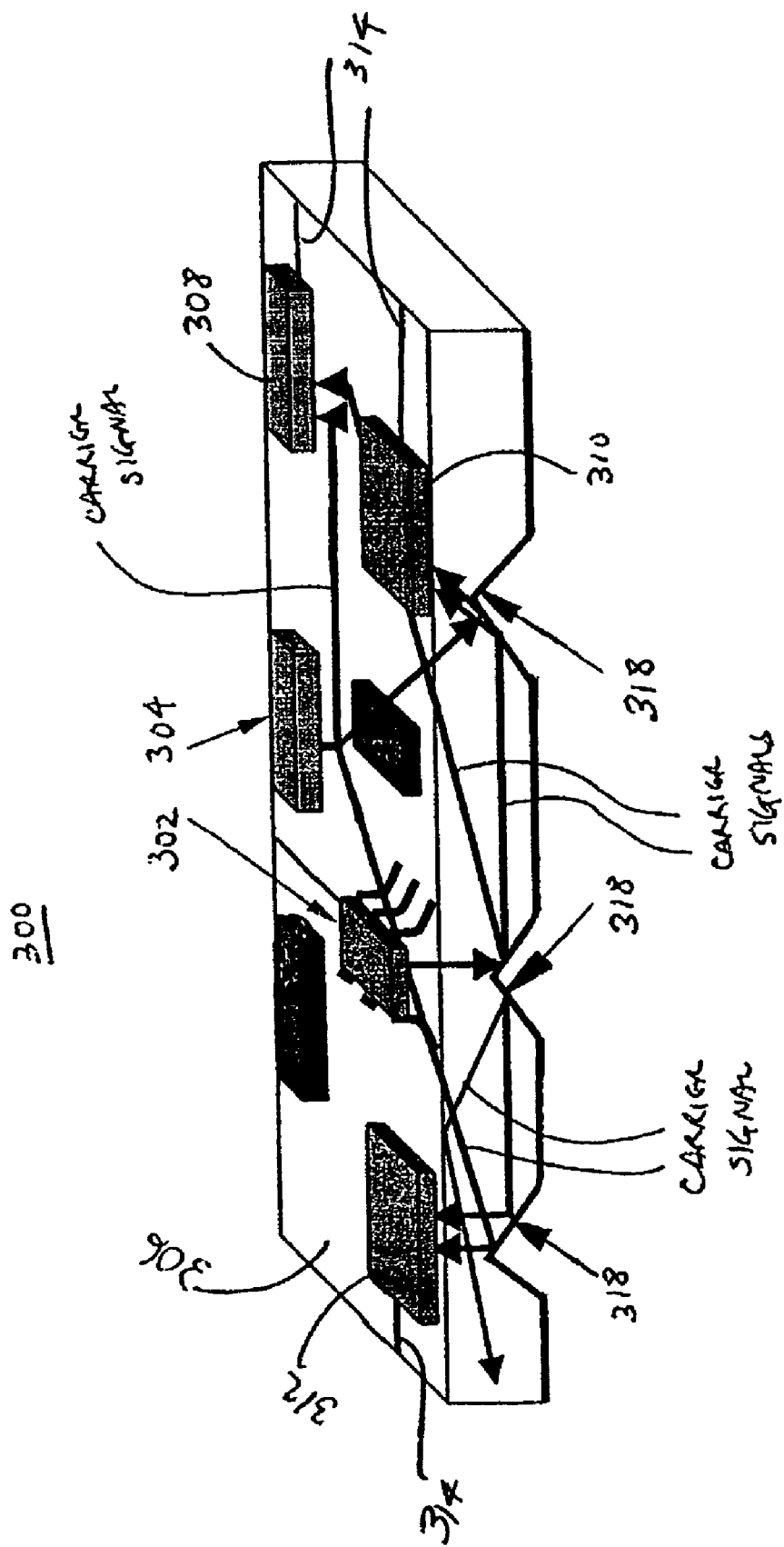
FIG. 3 is a perspective view of a signal conduction matrix shown with various electronic components according another embodiment.

Examples of the various possible configurations of a system incorporating the signal conduction matrix of the invention are provided in, for example, FIGS. 1–3 to illustrate how multiple signals, which are represented by light beams of different wavelengths, undergo multiple internal reflections and propagate towards their target destination. The present invention can be incorporated as part of an electronic system such as an integrated powertrain control system (IPCS). For light transfer over short distances, a molded matrix translucent or transparent to the signal frequencies can be used. On the opposite side of the substrate, a layer of reflective material can be deposited. The reflective material directs the light or RF signal into the matrix for subsequent collection by a target signal recipient.

The surface signal routers can be applied or incorporated onto the surface of the signal conduction matrix so a signal can be transferred directionally to their receivers. As FIG. 3 shows, the signal emitted from one source on a substrate surface can be received by several signal receivers through the aid of surface signal routers.

For a given substrate volume, the signals reflected by various surface signal routers can be combined into a total internal reflection signal. The total internal reflection signal can then be directed to another portion or section of the matrix where another component such as a receiver may receive and/or process the collected internally reflected signal.

When different frequencies are used, multiple signals can be transmitted simultaneously. One signal source can have several corresponding receivers. To eliminate possible interference between signals having different frequencies, frequency-specific filters, such as bandpass filters, can be used to selectively allow a signal with a particular frequency or frequency range to be picked up by an intended receiver. The signals can also be amplified during signal propagation so the signal can propagate over longer distances.

FIG. 1 is a perspective view of a signal conduction matrix 100 that can be used for or incorporated with an electronic component system. The signal conduction matrix 100 comprises signal sources 102, 104, a signal conduction matrix 106, and signal receivers or collectors 108, 110, 112. The signal sources 102, 104 and receivers 108, 110, 112 are linked by connectors 114 to other components (not shown) in the electronic component system. The connectors 114 may be wires, optical connectors, other conveyance devices, or a combination of these connectors. The signal conduction matrix 100 may have other configurations with either fewer or more components.

The signal sources 102, 104 and receivers 108, 110, 112 are operatively connected to one or more surfaces of the signal conduction matrix 106. Each signal source 102, 104 and each receiver 108, 110, 112 may be on the same or different surfaces of the signal conduction matrix 106.

As used herein, "operatively connected" refers to the formation of an optical, electrical, or other interface for transmitting and receiving the signals through the signal conduction matrix 106. The phrase "operatively connected" also means being connected, attached, or bonded to a surface using attachment configurations, attachment substances, other attachment mechanisms, or any of their combination to affix the signal sources 102, 104 and the receivers 108, 110, 112 onto the signal conduction matrix 106. Attachment configurations include physical adaptations of the signal conduction matrix 106 such as an indentation or a pressure fit structure. Attachment substances include adhesives, resins, solder, and other substances that can function as suitable attachment substances.

Each signal source 102, 104 transmits one or more signals through the signal conduction matrix 106 to one or more signal receivers or collectors 108, 110, 112. Preferably, the signal sources 102, 104 transmit the one or more signals in response to an input signal from the electronic component system. The signal sources 102, 104 may transmit the one or more signals continuously, in pulses, or through a combination of continuous or pulsed signals. Each signal source 102, 104 can be any electromagnetic radiation generation device. For example, the signal sources 102, 104 may be a visible light generation device such as a light emitting diode (LED). In another aspect, at least one signal source is a radio frequency (RF) generation device such as an RF transmitter. In a further aspect, a first signal source 102 is an electromagnetic radiation generation device such as a green LED, and the second signal source 104 is another electromagnetic radiation generation device such as a blue or infrared LED.

Each signal receiver 108, 110, 112 is an electromagnetic radiation reception or collection device such as a photodiode or an RF receiver. Each receiver 108, 110, 112 receives or collects one or more signals from the signal conduction matrix 106. Preferably, each receiver 108, 110, 112 provides an output signal to the electronic component system in response to the signal. Each receiver 108, 110, 112 may have a frequency specific filter to reduce or eliminate interference from signals with different frequencies. The frequency specific filter allows a particular signal receiver to selectively receive a signal having one particular frequency. The receivers 108, 110, 112 may be positioned essentially anywhere on the surface of the signal conduction matrix 106 to receive the one or more signals. Multiple signal receivers may receive the signal from a single signal source.

In yet another aspect of the invention, a signal source and a receiver may be integrated into a single component such as an RF transceiver, which may transmit a first signal at a given time and receive a second signal at another time. The first and second signals may have different frequencies.

Each signal may essentially diffuse throughout the entire volume of the signal conduction matrix 106. As used herein, "essentially diffuses" refers to the propagation of a signal in substantially all directions within the signal conduction matrix 106 unless, for example, a component blocks the signal. A signal may propagate in various directions as it undergoes multiple internal reflections within the signal conduction matrix.

The signals are any electromagnetic frequency capable of transmission through the signal conduction matrix 106 and communication between the signal sources 102, 104 and the receivers 108, 110, 112. The signals may be a combination of electromagnetic frequencies. Thus, the signals may have a frequency that lies in the visible, ultraviolet, or IR region of the electromagnetic spectrum. The signal can also be an RF signal. The signals may have one or more modulated and/or coded signals. The signals may be amplified to allow a longer transmission distance.

The signal conduction matrix 106 may have various configurations such as flat, curvilinear, wavy, or asymmetrical. The signal conduction matrix 106 may also have various dimensions including non-uniform thickness, width, and length. The signal conduction matrix 106 can be a molded material so that the material can be cast and cured into a desired shape or size.

The signal conduction matrix 106 may be used in combination with one or more substrates in a component or structure such as a printed circuit (PC) board. In one aspect, the signal conduction matrix 106 forms part of a PC board layer, or it can form the entire PC board layer. In another aspect, the signal conduction matrix 106 comprises one or more strips ironed or otherwise pressed onto a surface of a PC board. The signal conduction matrix 106 may be divided into portions or sections that are separated by a reflective or absorptive material.

The electronic component system may be an automobile control panel, which is described in detail below. The electronic component system can also be a wireless video streaming system having cluster, interior, and exterior cameras, a multimedia/telematics functions including real time video and networking, intelligent transportation system controls, single-source backlighting and graphics lighting, electronics integration with night vision, laser burst download systems, heads-up displays, biometric identification, multi-zone and personalized climate control systems, lane detection devices, rain and moisture signal receivers, occupant classification and restraint controls, suspension and steering controls, drowsiness detection, collision warning and avoidance, higher speed safety systems, air bag enabling systems, door close and lock signal receivers, fuel level signal receivers, aircraft electronic systems, and vehicle to vehicle communication and tracking system.

FIG. 2 is a side view of a signal conduction matrix 200 that can be used for or incorporated as part of an electronic component system. The signal conduction matrix 200 comprises a signal source 202, a signal conduction matrix 206, and a signal receiver 208. The signal source 202 and receiver 208 are operatively connected to a surface of the signal conduction matrix 206. The signal source 202 transmits one or more signals through the signal conduction matrix 206 to the receiver 208. The signal conduction matrix 206 comprises one or more materials translucent or transparent to the frequency or frequencies of the signals. The signal conduction matrix 206 has a reflective coating 216 on one or more surfaces. In one aspect, the reflective coating 216 covers the entire surface of the signal conduction matrix 206 except for the portions of the surface where the signal source 202 and receiver 208 are operatively connected to the signal conduction matrix 206. In another aspect, the reflective coating 216 covers a surface of the signal conduction matrix 206. In yet another aspect, the reflective coating 216 covers only the surface of the signal conduction matrix 206 on the opposite side of the signal source 202 and the receiver 208. The reflective coating 216 may comprise any material that reflects the signals within the signal conduction matrix. Typically, the signal conduction matrix 206 has a different refractive index from that of the reflective coating 216. In one aspect, the signal conduction matrix 206 has a higher refractive index than the reflective coating 216. The reflective coating 216 includes one or more metallic alloys or metals such as aluminum, copper, silver, or gold.

FIG. 3 is a perspective view of another system that incorporates a signal conduction matrix 300 and various components. The signal conduction matrix 300 comprises signal sources 302, 304, a signal conduction matrix 306, and receivers or collectors 308, 310, 312. The signal sources 302, 304 and receivers 308, 310, 312 can be linked by connectors 314 to other subcomponents of the electronic component system. The signal sources 302, 304 and receivers 308, 310, 312 are operatively connected to one or more surfaces of the signal conduction matrix 306. Each signal source 302, 304 transmits one or more signals through the signal conduction matrix 306 to one or more signal receivers or collectors 308, 310, 312. The signal conduction matrix 306 comprises one or more materials translucent or transparent to the frequency or frequencies of the signals. The signal conduction matrix 306 has at least one surface signal routers 318 that assist in directing the signals toward the receivers 308, 310, 312. The surface signal routers 318 can have various configurations such as an inverted pyramid shape. The signal conduction matrix 306 may have one or more surface signal routers 318 formed on the surface of the signal conduction matrix 306 from across the signal source 302, 304 and the receivers 308, 310, 312.

Figure 4:
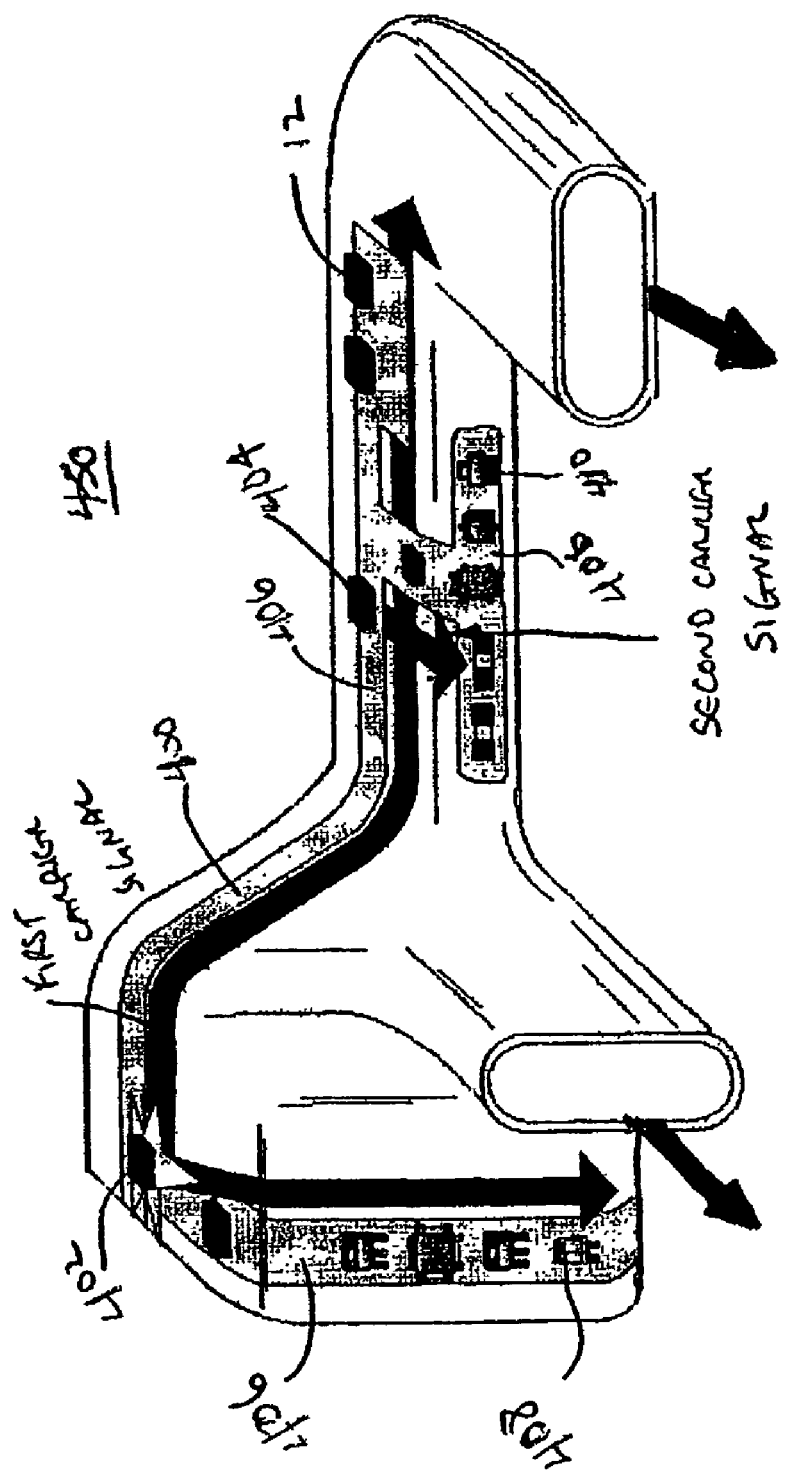
FIG. 4 is a cutaway view of an electronic component system that incorporates a signal conduction matrix.

FIG. 4 is a cutaway view of an electronic component system 450 that incorporates a signal conduction matrix 400. The electronic component system 450 can be an automotive control panel, as shown here, or another electrical system. The matrix 400 comprises a first signal source 402, a second signal source 404, a matrix strand 406, a first detector 408, second detector 410, and a third detector 412. The arrows represent signals undergoing internal reflections. The first signal source sends a first signal to the first detector 408 and the third detector 412. The second signal source sends a second signal to the second detector 410. The first and second signals may have the same or different frequency.

Figure 5:
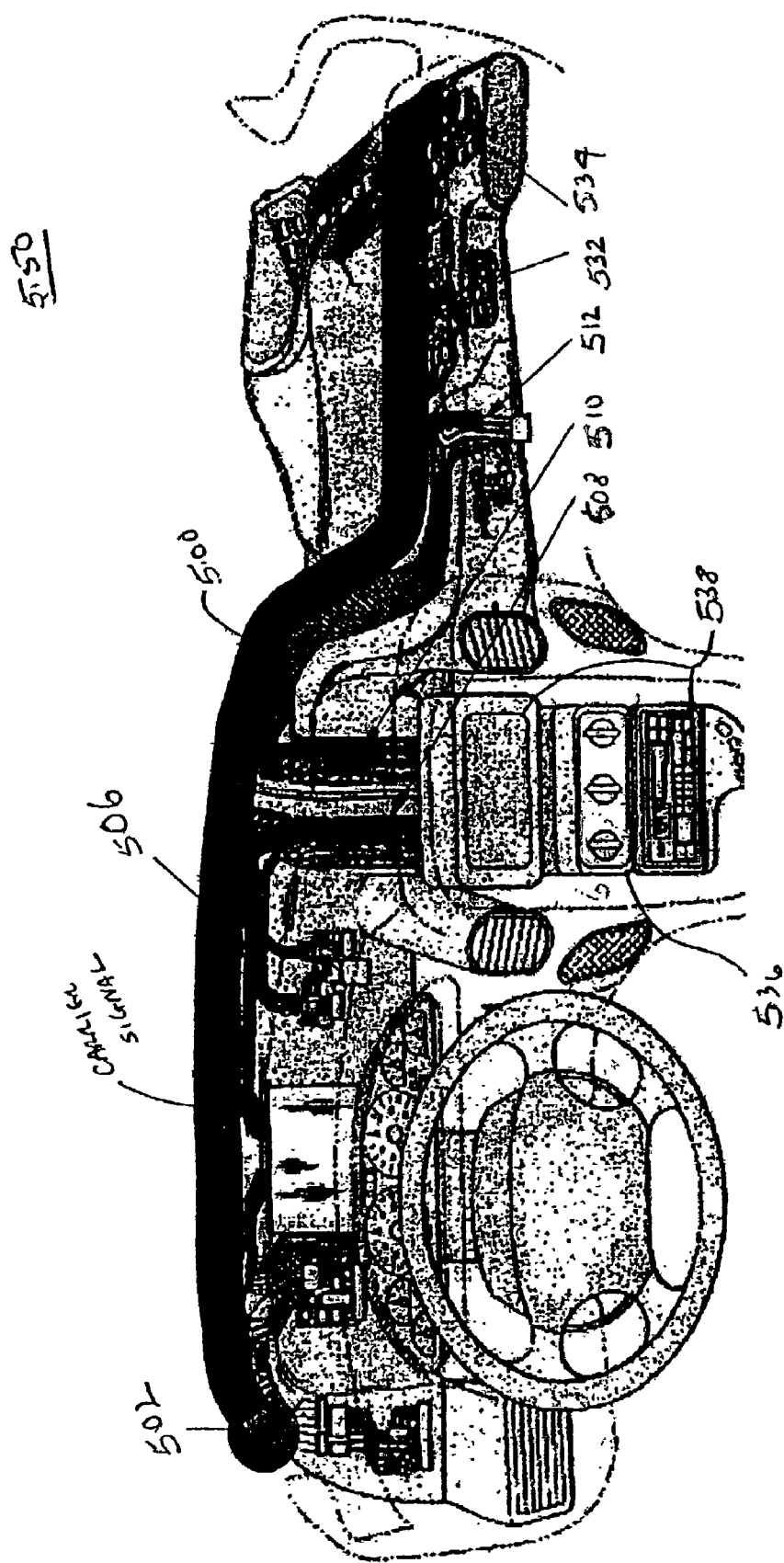
FIG. 5 is a perspective view of an automotive panel display that incorporates a signal conduction matrix.

FIG. 5 is a perspective view of an automotive display panel 550 that incorporates a signal conduction matrix 500. The display panel also includes a signal source 502, a matrix strand 506, a first detector 508, a second detector 510, third detector 512, fourth detector 532, and fifth detector 534. The signal source 502 may transmit a signal in response to an input signal from another component such as a central processing unit. The signal passes through the matrix strand 506 to the detectors 508, 510, 512, 532, and 534. The first detector 508 sends a first output signal to an external electrical device such as an environmental control device 536. The second detector 510 sends a second output signal to another external electrical device such as an audio control device 538. Similarly, the third, fourth, and fifth detectors send output signals to other external electronic devices. The signal may be a coded and/or modulated, amplified, or frequency converted.

Figure 6:
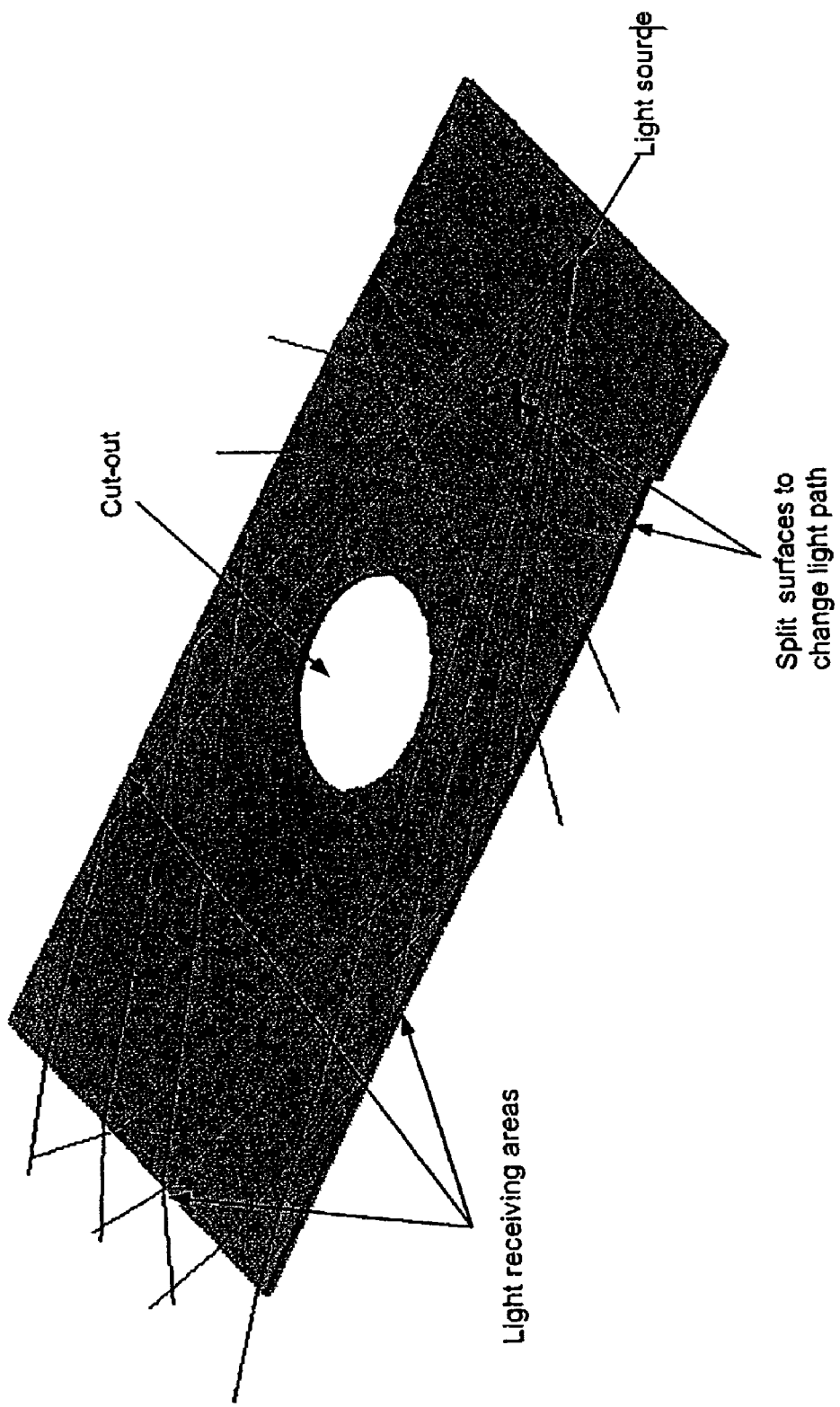
FIG. 6 illustrates the various signal pathways in a signal conduction matrix.

FIG. 6 depicts the various signal pathways of signals propagating within a signal conduction matrix. To avoid obstructions in the signal path, a method of redirecting the signal can be implemented into the substrate. A plastic or metal insert with reflective surface properties at desired angles can be molded inside the substrate at appropriate locations to direct the light signal in the desired destination. A light transmitter may be used as a diverging or diffusing element so the output can cover a large volume of the substrate. If a narrow beam is used, such as a highly focused laser beam, a diffuser may be placed between a light source and the matrix. An element or component through which the light signal enters the substrate may also be roughened to act as a diffuser for dispersing the light signal. Based on the same principle, the light signal can be directed and redirected using a rough surface elsewhere within the substrate so that multi-directional signal transmission is achieved.

Figure 7:
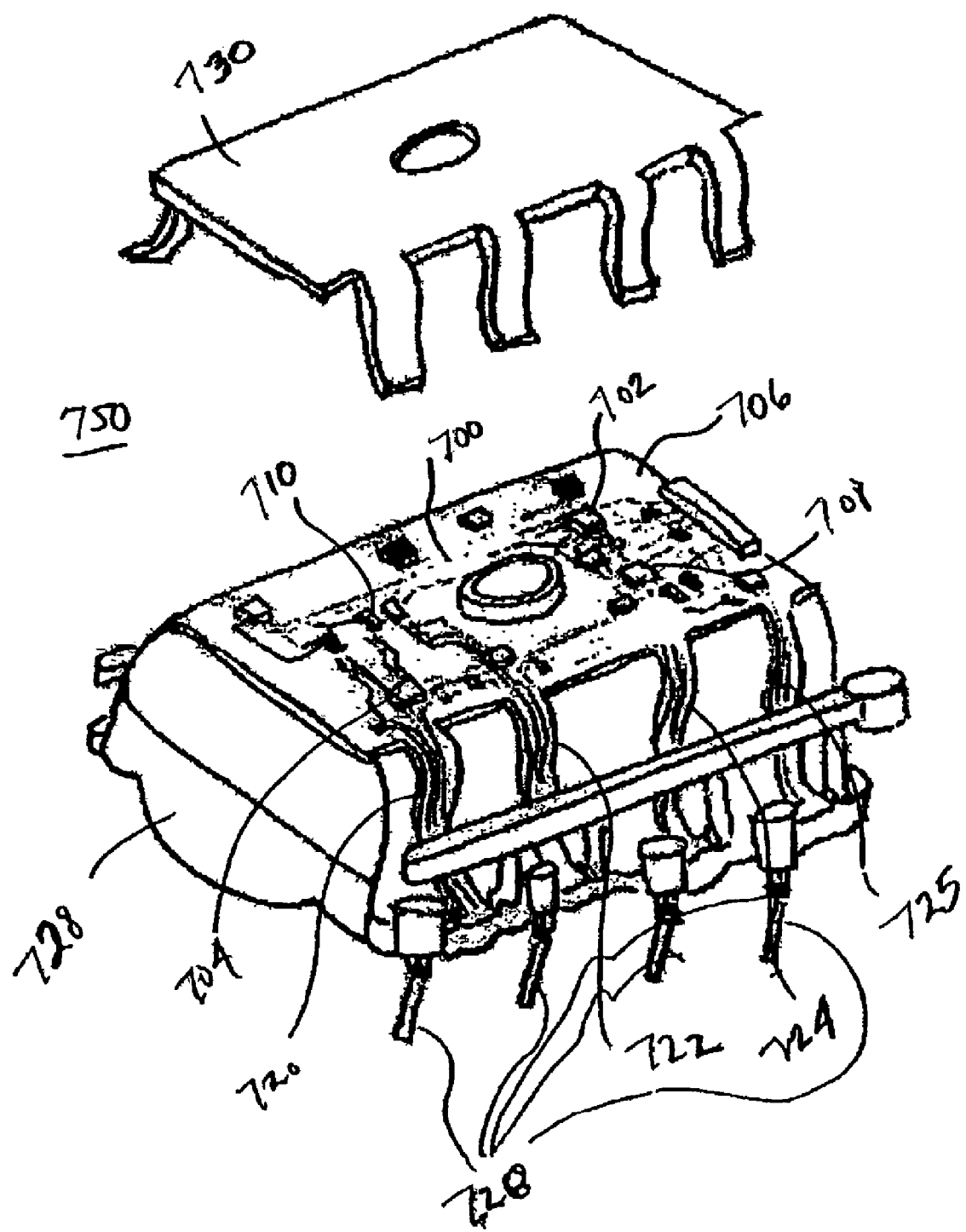
FIG. 7a is a perspective view of an Integrated Powertrain Control System (IPCS) that incorporates a signal conduction matrix.
FIG. 7b shows an IPCS system that incorporates a molded signal conduction matrix, splitters, and reflectors.
Figure 7:
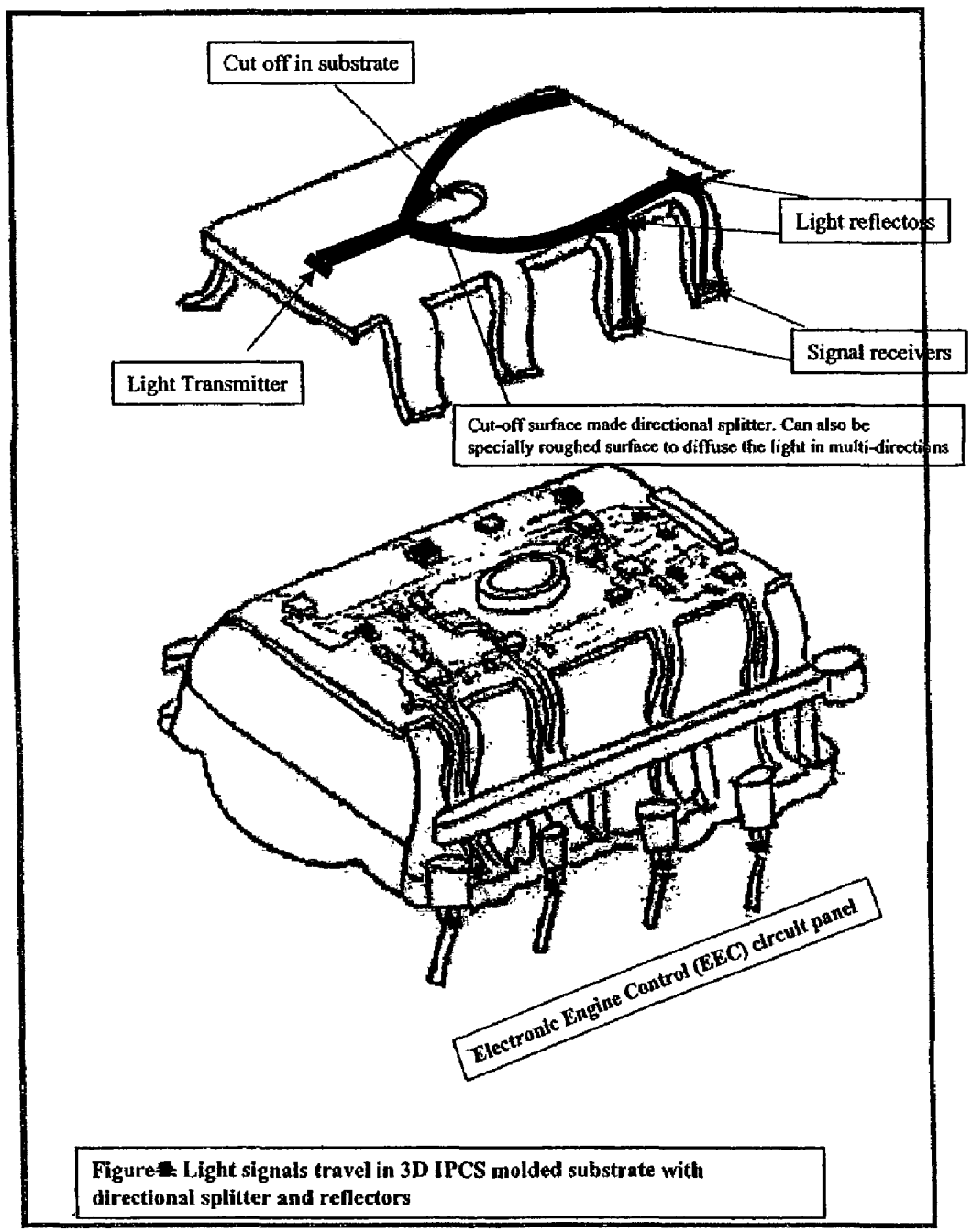

FIG. 7a is a perspective view of an electronic component system 750 that incorporates a signal conduction matrix 700. As shown, the electronic component system 750 is an integrated power train control system (IPCS) that has a base 728 and a cover 730. The matrix 700 preferably comprises signal sources 702, 704, a matrix strand 706, and detectors or collectors 708, 710. The matrix strand 706 may be disposed across and may be incorporated with the base 728. The signal sources 702, 704 and detectors 708, 710, 712 are linked by wires 720, 722, 724, 726 to pin connections 728, which connect to other components (not shown). Preferably, the signal sources 702, 704 transmit the signals in response to an input signal from the pin connections 728. Preferably, the detectors 708, 710, 712 transmit an output signal to the pin connections 728 in response to the signals.

FIG. 7b shows an IPCS that incorporates a signal conduction matrix, splitters, and reflectors. For a given obstruction in a layer of the substrate, the directional splitter redirects a light signal using a molded piece of material such as plastic, metal or a rough surface to diffuse the light signal. This allows bypassing of any obstacle present in the signal path. Also shown are molded-in reflectors that redirect the light signal to a desired location.

FIGS. 8a–d are perspective views of an IPCS that incorporates a signal conduction substrate and optical fibers molded inside the matrix. In this configuration, the IPCS circuitry is both optical and electrical. The two integrated circuits (IC) that control the timing of the firing of the eight spark plugs in an 8-cylinder engine can be replaced and controlled by one or more optoelectronic devices such as a transmitter. Light signals, as opposed to electrical signals in a conventional power distribution system, can be transmitted as digital signals. The light signals received at each cylinder spark location are used to switch on and off an ignition coil so that an electrical spark can ignite the combustion of an air-and-fuel mixture in a cylinder. Further, with respect to fuel injection, optoelectronic chips can replace I/C chips that control the opening and closing of valves in the fuel injection ports.

Figure 8:
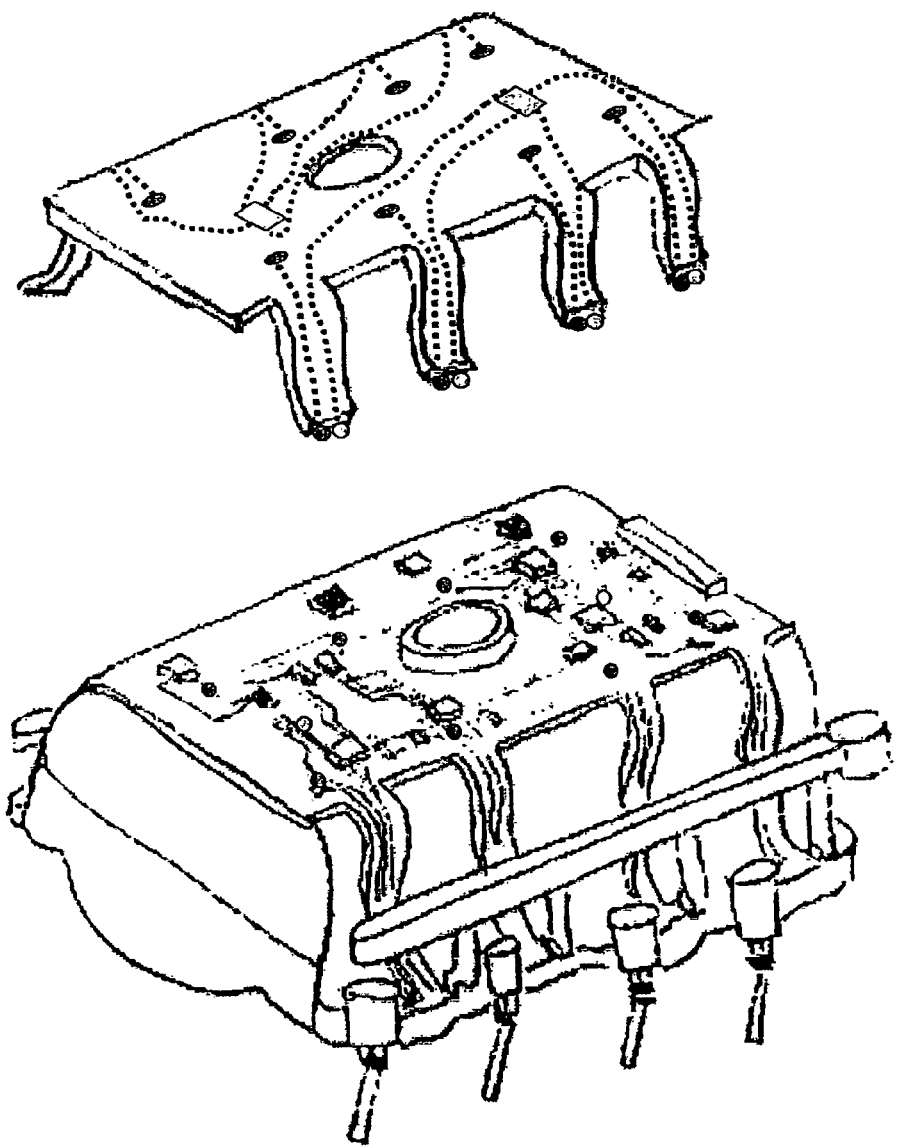
FIG. 8a shows an IPCS system that incorporates a molded signal conduction matrix that includes optical fibers molded inside the matrix.
FIG. 8b shows another configuration of an IPCS system in which the light travels in a molded wave guide.
FIG. 8c shows a variation of the IPCS system shown in FIG. 8(b).
FIG. 8d shows another configuration of an IPCS system that incorporates a signal conduction matrix.
Figure 8:
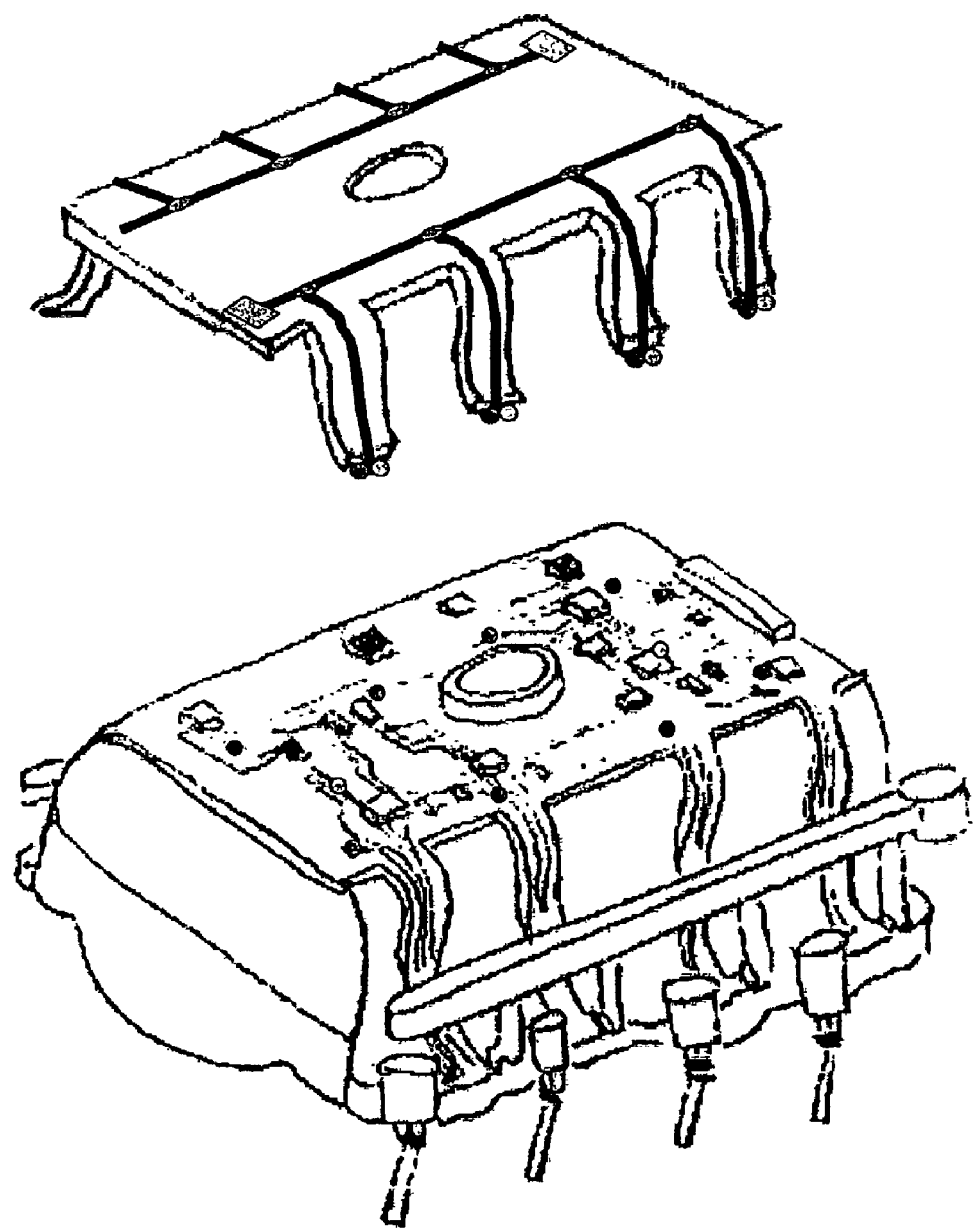
Figure 8:
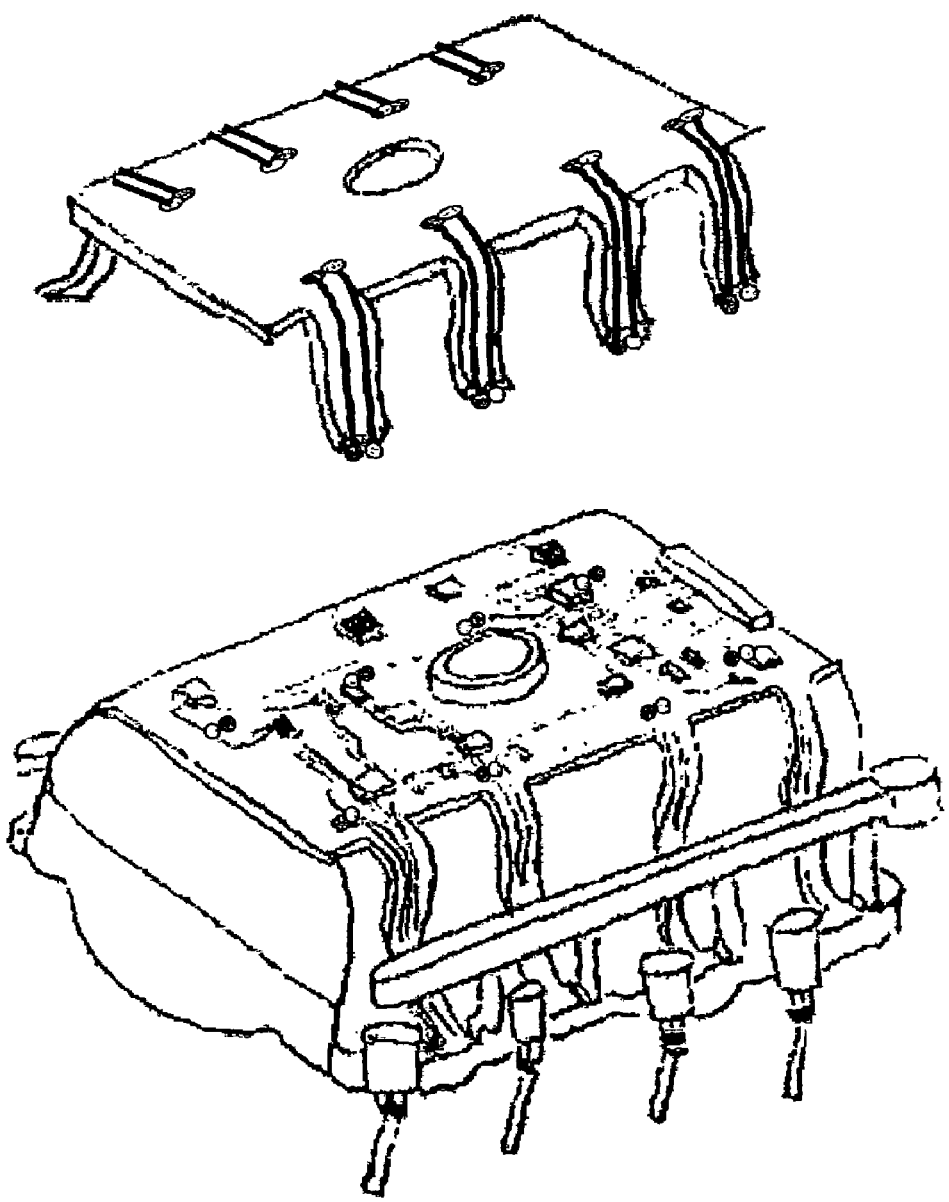
Figure 8:
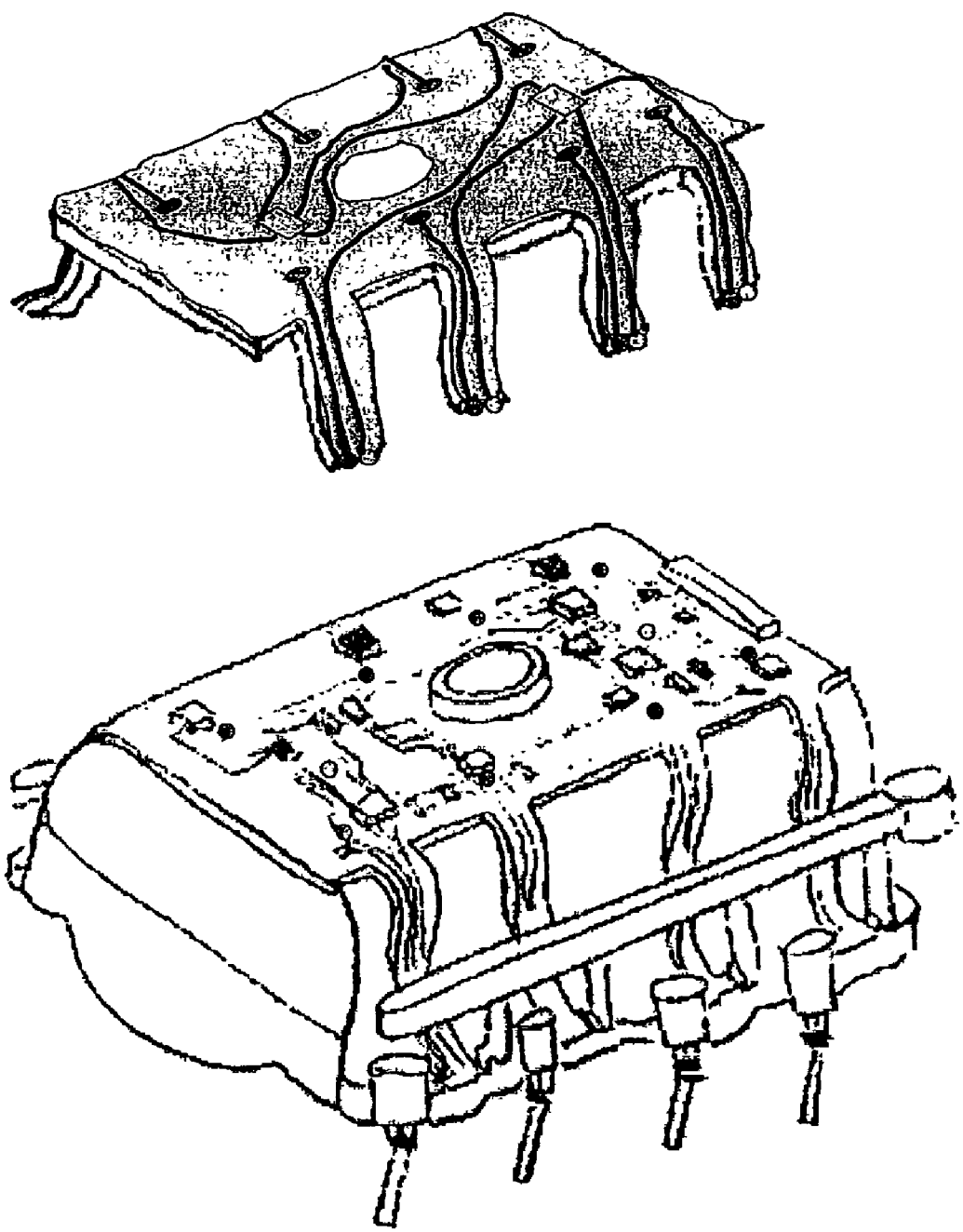

FIG. 8a shows an IPCS that comprises a signal source for the fuel injection, a signal source for the firing spark, a receiver for the fuel injection, a receiver for the firing spark, and a signal conduction matrix. In this IPCS configuration, optical fibers are molded inside the signal conduction matrix. A single wavelength of light from a signal source can be used for all communications. FIG. 8b shows an IPCS in which light travels in a molded wave guide. In this configuration, a transmitter for the firing spark and the fuel injection uses the same light channel. FIG. 8c shows an IPCS in which a cylinder has an individual signal source for each firing spark cylinder. The IPCS also has individual signal sources for every fuel injection port. A light channel in this configuration is molded into the substrate. FIG. 8d shows another IPCS configuration in which light travels in a molded wave guide. In this IPCS configuration, a transmitter for the firing spark and the fuel injection uses a same light channel.

In the present invention, signal receivers preferably have at least one photo-voltaic receptors that converts light energy into electrical energy. The electrical energy can then be used to power the signal receivers. In one aspect, the electrical energy is stored in a capacitor and used as needed.

The signal receivers are preferably embedded within the matrix or attached to it. In one aspect of the invention, an emitted signal or energy from the central signal source may be directed to the signal receivers using a routing means such as a prism, lens, or mirror through the matrix.

Power sources that produce energies corresponding to different wavelengths may be used to power different signal receivers that have photoreceptors sensitive to certain wavelengths. Further narrowing of a wavelength range may be performed using at least one optic element such as bandpass filter.

Data obtained from the signal receivers may be transmitted through a main communication bus to an electronic system, such as an electronic controller, for further data processing. The data may be transmitted using a light signal, such as an IR signal. A power distribution system may also be included in an instrument panel, on-engine system, or other devices that require power distribution to the signal receivers.

Preferably, the matrix comprises a polymeric material. The material comprising the matrix may be polybutylene terephthalate, polyethylene terephthalate, polypropylene, polyethylene, polyisobutylene, polyacrylonitrile, poly(vinyl chloride), poly(methyl methacrylate), silica, or polycarbonate. Preferably, the polymeric material is a photorefractive polymer.

The polymeric material that forms the signal conduction matrix may be connected to or manufactured as part of engine structures such as intake manifolds. Information obtained from the signal receivers that relates to monitored parameters can then be routed through the signal conduction matrix to at least one electronic system such as a process control system.

Preferably, the signal conduction matrix material is made of at least one material that allows the transmission of light of various frequencies. Thus, for example, the matrix may comprise a first material transparent or translucent to a first frequency of the signals and a second material that is transparent or translucent to a second frequency of the signals.

The signal conduction matrix can have various configurations. Thus, the matrix may be flat, curvilinear, wavy, or asymmetrical. The matrix may also have various dimensions including non-uniform thickness, diameter, width, and length. The matrix may be fabricated using a moldable material so that the matrix can be cast and then cured to a desired shape. The matrix may have sections or areas that are connected, molded, or pressed onto a surface of a circuit board. In one aspect, the matrix is integrated with structures such as printed circuit boards, flexible substrates, flatwire, and MID (Molded in Device) circuits.

The entire signal conduction matrix may be coated with a reflective material. Preferably, the reflective coating minimizes energy loss by reducing the intensity of the optical signal that leaks out of the matrix.

The matrix preferably has a reflective coating on at least one of its surfaces. In one aspect of the invention, the reflective coating covers the entire surface or substantially the entire surface of the matrix except for the portions of the surface where the signal source and signal receivers are operatively connected to the matrix. The reflective coating may be used to, for example, cover only the surface of the matrix that substantially encompass a volume of the matrix through which the signal source is transmitted to the signal receivers.

The reflective coating may comprise any material that reflects the signal transmitted through the matrix. The reflective coating may also comprise at least one metal or metallic alloy containing metals such as aluminum, copper, silver, or gold.

The signal source may be a light source. An example of a preferred light source is an infrared light source. However, the signals can have any electromagnetic frequency capable of transmission through the matrix and communication between the signal source and the signal receivers. The signal being transmitted may be a combination of electromagnetic frequencies. The signal source includes, but is not limited to, an LED, a laser, or an RF source. The laser may emit IR, visible, or ultraviolet light.

A signal may be directed to any or various directions within the matrix, unless, for example, the signal source or another component blocks the signal. The signals may propagate, sequentially or simultaneously, along the same or opposite directions. The signal receivers may be positioned in any suitable location on a surface of the matrix where the signal receivers can receive a signal from at least one signal source. Multiple signal receivers may receive signals from a single signal source.

The signal source is preferably an electromagnetic radiation generation device. Preferably, each signal source is a light generation device such as a laser or a light emitting diode (LED). Alternatively, each signal source is a radio frequency (RF) generation device such as an RF transmitter. For example, a first signal source may be an electromagnetic radiation generation device such as a LED or a laser and a second signal source may be an RF transmitter.

A signal source and at least one signal receiver may be integrated with a component such as an RF transceiver, which may transmit a first signal at a given time and receive a second signal at another time. The first and second signals may have the same or different frequencies. The signal receiver may include both a detector and another component such as a capacitor where the collected energy may be stored.

Signals such as optical signals from optoelectronic transmitters can be channeled or transported through air if there are no obstacles in their path. The transmitters preferably generate a light signal with a unique wavelength. In an aspect of the invention, a wavelength selective filter is placed in front of the signal receiver so that little or no interference occurs between different transmitters and signal receivers.

As used herein, a signal receiver refers to a device that receives a signal from a given source. The signal received by a signal receiver may be a light signal. Thus, a signal receiver may include at least one component such as a photodetector or both a photodetector and a capacitor. In particular, at least one of the signal receivers may include an electromagnetic radiation reception or collection device such as a photodiode or an RF sensor. The signal receivers include, but are not limited to, photodiodes, microchannel plates, photomultiplier tubes, or a combination of signal receivers. The signal receivers may receive or collect at least one signal through the matrix. In one aspect of the invention, the signal receivers provide an output signal to an electronic system in response to a signal that propagates through the matrix. The signal receivers preferably have at least one frequency specific filters to reduce or eliminate interference from signals with certain frequencies or frequency ranges.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A signal transmission system comprising:
    a signal conduction matrix formed into a shape that allows transmission of a signal through the signal conduction matrix from one point to another through the use of at least one surface signal router;
    at least one signal source that is operatively connected to a surface of the signal conduction matrix and that generates a signal that propagates through the signal conduction matrix; and
    at least one signal receiver that is operatively connected to a surface of the signal conduction matrix and that receives the signal from the signal source;
    wherein the signal conduction matrix forms part of an automotive panel display electronic component.

2. The signal transmission system of claim 1, wherein the signal conduction matrix comprises at least one material selected from a group consisting of polybutylene terephthalate, polyethylene terephthalate, polypropylene, polyethylene, polyisobutylene, polyacrylonitrile, poly(vinyl chloride), poly(methyl methacrylate), silica, and polycarbonate.

3. The signal transmission system of claim 1, wherein the at least one surface signal router is a reflective coating on a surface of the matrix.

4. The signal transmission system of claim 3, wherein the reflective coating is selected from a group consisting of a metal and a metal alloy.

5. The signal transmission system of claim 1, wherein the at least one surface signal router is selected from a group consisting of an indentation, pressure fit structure, and an inclined cut on the surface of the matrix.

6. The signal transmission system of claim 1, wherein the signal generated by a signal source is selected from a group consisting of a light signal and an RF signal.

7. The signal transmission system of claim 1, wherein the electronic component system is an integrated powertrain control system.

8. The signal transmission system of claim 1, wherein the signal conduction matrix forms a substantial part of the automotive panel display.

9. The signal transmission system of claim 1, wherein the electronic system is selected from a group consisting of a wireless video streaming system, intelligent transportation system controls, single-source backlighting and graphics lighting, electronics integration with night vision, laser burst download systems, heads-up displays, biometric identification, multi zone and personalized climate control systems, lane detection devices, rain and moisture signal receivers, occupant classification and restraint controls, suspension and steering controls, drowsiness detection, collision warning and avoidance, higher speed safety systems, air bag enabling systems, door close and lock signal receivers, fuel level signal receivers, aircraft electronic systems, and vehicle to vehicle communication and tracking system.

10. A signal transmission system comprising:
    a signal conduction matrix formed into a shape that allows transmission of a signal through the signal conduction matrix using at least one surface signal router;
    at least one signal source that is operatively connected to a surface of the signal conduction matrix and that generates a signal that propagates through the signal conduction matrix; and
    at least one signal receiver that is operatively connected to a surface of the signal conduction matrix and that receives a signal from the signal source;
    wherein a signal is coded to allow selective detection of the signal by a target signal receiver; and
    wherein the signal conduction matrix forms part of an automotive panel display electronic component.

11. The signal transmission system of claim 10, wherein the signal conduction matrix comprises at least one material selected from a group consisting of polybutylene terephthalate, polyethylene terephthalate, polypropylene, polyethylene, polyisobutylene, polyacrylonitrile, poly(vinyl chloride), poly(methyl methacrylate), silica, and polycarbonate.

12. The signal transmission system of claim 10, wherein the at least one surface signal router is a reflective coating on a surface of the matrix.

13. The signal transmission system of claim 12, wherein the reflective coating is selected from a group consisting of a metal and a metal alloy.

14. The signal transmission system of claim 10, wherein the at least one surface signal router is selected from a group consisting of an indentation, pressure fit structure, and an inclined cut on the surface of the signal conduction matrix.

15. The signal transmission system of claim 10, wherein the signal generated by a signal source is selected from a group consisting of a light signal and an RF signal.

16. The signal transmission system of claim 10, wherein the signal conduction matrix forms a substantial part of the automotive panel display.

17. The signal transmission system of claim 1, wherein the electronic system is selected from a group consisting of a wireless video streaming system, intelligent transportation system controls, single-source backlighting and graphics lighting, electronics integration with night vision, laser burst download systems, heads-up displays, biometric identification, multi zone and personalized climate control systems, lane detection devices, rain and moisture signal receivers, occupant classification and restraint controls, suspension and steering controls, drowsiness detection, collision warning and avoidance, higher speed safety systems, air bag enabling systems, door close and lock signal receivers, fuel level signal receivers, aircraft electronic systems, and vehicle to vehicle communication and tracking system.

* * * * *